Dec. 21, 1926.
L. H. SOENS
CHAIN FASTENER
Filed March 15, 1926
1,611,492
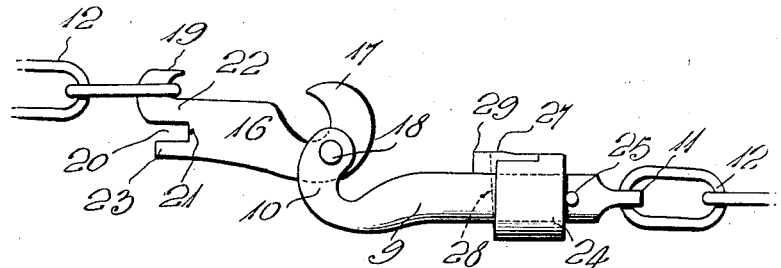
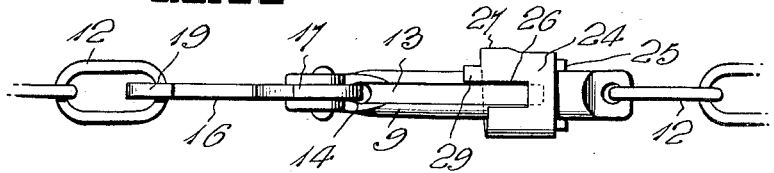
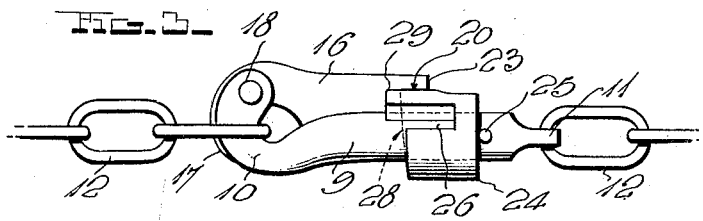
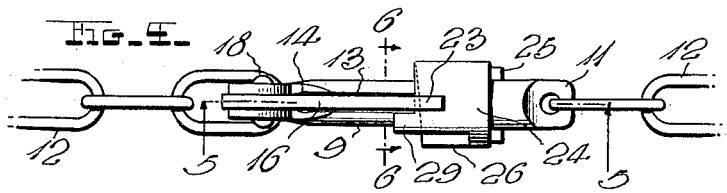
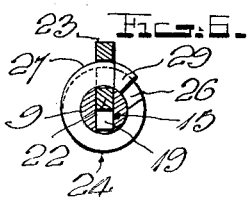

Patented Dec. 21, 1926.

1,611,492

UNITED STATES PATENT OFFICE.

LOUIS H. SOENS, OF MANCOS, COLORADO, ASSIGNOR OF ONE-HALF TO VICTOR H. MEINZER, OF MANCOS, COLORADO.

CHAIN FASTENER.

Application filed March 15, 1926. Serial No. 94,882.

The invention relates to improvements in devices for fastening chains and the like and it has reference more particularly to devices of this class designed primarily for use upon the side chains of the ordinary tire chain.

It is the object of the invention to provide a new and improved form of fastener embodying novel means for tightly holding the device in locked position, while permitting its release when desired, provision being made whereby a rotatable sleeve which locks the device in operative position, will be tightly held in its effective position, by a wedging action.

With the foregoing in view, the invention resides in the novel subject matter hereinafter described and claimed, the description being supplemented by the accompanying drawing.

Figs. 1 and 3 are side elevations showing the device respectively released and locked.

Figs. 2 and 4 are plan views showing the device in the positions of Figs. 1 and 3 respectively.

Fig. 5 is a longitudinal sectional view as indicated by line 5—5 of Fig. 4.

Figs. 6 and 7 are transverse sectional views on line 6—6 of Fig. 4, showing the sleeve in locked and released position respectively.

Fig. 8 is a fragmentary side elevation showing a modified form of construction.

The structural details herein disclosed, may be considered as preferred, with the understanding however that within the scope of the invention as claimed, various modifications may be made.

The numeral 9 designates an elongated shank having a lateral hook 10 at one end and an eye or the like 11 at its other end, the latter being adapted for connection to one end of the side chain 12. The shank 9 is formed with a longitudinal recess or channel 13 which opens laterally and communicates at one end with a slot 14 formed through the hook 10, the other end of said groove communicating with an opening 15, in the present disclosure.

An arm 16 is provided with a hooked end 17 which is pivoted at 18 in the slot 14, this arm and its hook being engageable with a link on the other end of the side chain 12, the primary function of the hook 17, being to throw this link out of the hook 10, when the arm 16 is swung outwardly. The outer end of arm 16 is provided, in the present disclosure, with an auxiliary hook 19 for engagement with the side chain when initially adjusting the tire chain to the wheel, and when the arm 16 is swung over toward the shank 9, said hook 19 is received in the opening 15, a portion of the width of said arm 16, being then received in the groove 13, while the remainder of such width projects laterally from the shank 9. This projecting portion of the arm 16 is formed with a notch 20 at the free end of the arm, providing this arm with a shoulder 21 formed by the inner end of said notch, and with inner and outer portions 22 and 23 at the inner and outer sides of said notch, for purposes to appear.

A sleeve 24 is rotatable about the shank 9 and at its outer edge, contacts with an abutment 25 on said shank, this sleeve being formed with a notch 26 which opens through its rear edge for registration with the groove 13, so that the arm portion 22 may move through said notch, when swinging arm 16 from one position to the other. When arm 16 is swung inwardly and the sleeve is turned, the inner portion of said sleeve is received in the notch 20 and is then in the outward path of the arm portion 22, so that arm 16 cannot swing outwardly. Then, the arm portion 23 is of course at the exterior of the sleeve 24 and it will be seen from Fig. 6 and Fig. 7 primarily, that the radial thickness of the sleeve is gradually increased, providing a wedge formation 27 to tightly wedge between the arm portions 22 and 23, thus serving to tightly hold the sleeve in operative position. By reference to other views, it will also be seen that the width of the sleeve 24 is given an increase as indicated at 28, thus permitting said sleeve to wedge between the shoulder 21 and the abutment 25, when it is rotated to operative position. By combining these two wedging actions in the single device, the fastener may be locked so tightly that it is practically an impossibility for it to become accidently released while in operation. Yet, when the sleeve 24 is positively turned in the proper direction to align its notch 26 with the groove 13, the arm 16 may be easily swung outwardly. To limit the movement of the sleeve in this direction, it is preferably provided with an appropriate stop 29 to strike the arm 16.

If desired, instead of having the sleeve 24 directly engage the abutment 25, a spring washer 30 may be interposed between the two, as indicated in Fig. 8, said washer being of any desired formation.

It will be seen from the foregoing that while the invention is rather simple and inexpensive, it will be highly efficient and in every way desirable. As previously stated, the details disclosed may be considered as preferred, with the understanding that numerous variations may be made within the scope of the invention as claimed.

I claim:

1. In a chain fastener, a shank having a laterally opening recess, an arm pivoted to the shank and having a free end portion whose width is partly received in said recess, the remaining width of said end of the arm projecting laterally from the shank and having a notch which opens away from the arm pivot, an abutment on the shank spaced outwardly from the notched end of the arm, and a rotatable sleeve surrounding the shank and of a width to extend from the inner end of said notch to said abutment, said sleeve having a notch opening through its inner edge for registration with said recess, to permit inward or outward swinging of said arm, said sleeve being receivable in the notch of the arm when rotated to bring its notch out of register with said recess and having a wedge formation which tightly binds it in place when so rotated.

2. A structure as specified in claim 1; said wedge formation being provided by an increase in the width of the sleeve, whereby the sleeve will bind against the inner end of the arm notch and said abutment.

3. A structure as specified in claim 1; said wedge formation being provided by an increase in the radial thickness of the sleeve, whereby the sleeve will bind against the side walls of the arm notch.

4. A structure as specified in claim 1; said wedge formation being provided by an increase in the width of the sleeve, and by an increase in the radial thickness of the sleeve whereby the sleeve will bind against the side walls of the arm notch and against both the inner end of this notch and the aforesaid abutment.

5. In a chain fastener, a shank, a sleeve rotatable thereon and having a notch, an arm pivoted to the shank and having a portion movable through said notch, said arm having a shoulder at the inner end of said portion, and an abutment on the shank engaging the outer edge of the sleeve, said sleeve having an increase in width, to wedge between said shoulder and said abutment when rotated, said sleeve then lying in the outward path of the aforesaid arm portion.

6. In a chain fastener, a shank, a sleeve rotatable thereon and having a notch, and an arm pivoted to the shank, said arm having a portion movable through said notch for disposition at the interior of the sleeve when the latter is rotated and also having a portion for disposition at the exterior of said sleeve, the latter having an increase in radial thickness to cause it to wedge between said arm portions.

In testimony whereof I have hereunto affixed my signature.

LOUIS H. SOENS.